UNITED STATES PATENT OFFICE.

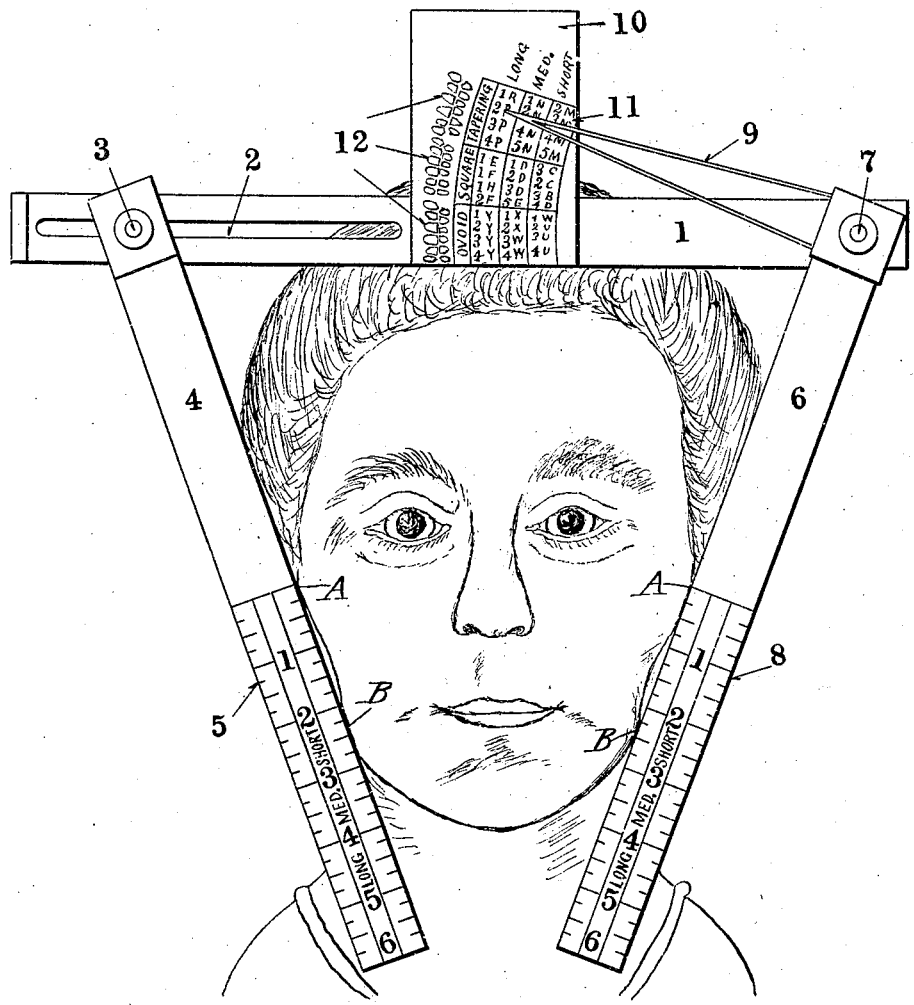

WILLIAM C. DALBEY, OF DU QUOIN, ILLINOIS, ASSIGNOR, BY MESNE ASSIGNMENTS, TO DENTISTS' SUPPLY COMPANY, A CORPORATION OF NEW YORK.

GAGE FOR SELECTING ARTIFICIAL TEETH.

1,378,527. Specification of Letters Patent. Patented May 17, 1921.

Application filed April 21, 1919. Serial No. 291,676.

*To all whom it may concern:*

Be it known that I, WILLIAM C. DALBEY, a citizen of the United States of America, residing at the town of Du Quoin, county of Perry, State of Illinois, United States of America, have invented a certain new and useful Gage for Selecting Artificial Teeth, of which the following is such a full, clear, and exact description as will enable any one skilled in the art to which it appertains to make and use the same, reference being had to the accompanying drawings, forming part of this specification.

My invention relates to a tooth gage and particularly to a gage by means of which both the form and size of a required tooth may be determined by means adjusted to the angular and linear configurations of the human face.

As is well known, skulls of different persons differ as to shape and in the same manner, the teeth of such differing skulls also differ. In the manufacture of artificial teeth, the tooth shapes have been designed to correspond as near as possible to the natural requirements and these have been designated as ovid, square, and tapering or similar designations; and also in addition to the general shape of the tooth, the length of the same must also be made to correspond to the vertical dimensions which would correspond to the skull and these dimensions have commercially been designated by names such as long, medium, short, associated with numbers and letters. It has been the practice for dentists to select what is believed to be the right tooth form by looking at the patient and then at the artificial teeth in stock or to illustrations in a catalogue and in a more or less uncertain manner select what they believe to be the proper teeth to suit the patient's requirement. The object of my invention is, therefore, to provide mechanical appliances which when adjusted to the head of the patient, will automatically indicate or designate the proper tooth form both as to shape and length which should be employed in the dental work to be performed upon or for the patient.

In carrying out my invention, I provide a suitable frame having adjustable arms which may be fitted to the face to correspond to the facial angle and also provide in conjunction with the frame a chart having designations thereon corresponding to the tooth forms and over which a pointer is caused to travel under the adjustment of the apparatus to the facial angle, whereby the tooth shape may be automatically indicated; and my improvements further comprehend suitable scale designations upon the lower parts of the adjustable arms, whereby a transfer measurement alinement of said parts in the vicinity of the chin of the patient will designate the proper tooth length to be employed in the dental work to be performed upon the patient. In this manner, the dentist is relieved from all uncertainties in the selection of the teeth.

My invention also comprehends details of construction which, together with the features above stated, will be understood by reference to the accompanying drawing which illustrates one form of tooth gage made in accordance with my invention.

1 indicates a bar used normally in horizontal position and provided at one end with a slot 2. Passing through the slot 2 is a bolt 3 by means of which an arm 4 is both slidingly and pivotally connected to the bar 1. The arm 4 is provided at its lower end with a scale 5. The bar 1 at the end opposite to the slot 2 carries a bolt 7 by means of which an arm 6 similar to the arm 4 is pivotally (but not slidingly) connected to the bar 1. The arm 6 is provided at its lower end with a scale 8 which is a duplicate of the scale 5 on arm 4, before referred to. The arm 6 is provided with a pointer 9 coöperating with a chart 10 carried on the bar 1 above its lower edge. This chart 10 is provided with a table 11 indicating tooth conformations. In the present instance, I have shown the three principal tooth conformations which are ovoid, square, and tapering. For each tooth conformation, I have shown three tables designed for long, medium, and short teeth and corresponding for length with the measurements on the scales 5 and 8. It will be evident that both, the number of tooth conformations and tooth lengths, of the table 11 may be increased. I also preferably provide the chart 10 with graphic representations 12 of the corresponding tooth conformations indicated by the table.

While it is desirable that the chart 10 shall be fixedly secured to the bar 1 and the pointer 9 be moved by the adjustable arm 6, as shown, nevertheless, it will be understood that the relative movement between the pointer 9 and chart 10 is the essential requirement and that broadly considered it would make no difference in the ultimate results whether the pointer moved over the chart or the chart moved over the pointer, and I, therefore, do not restrict myself in this respect.

In using my device, the bar 1 is held in horizontal position and raised or lowered until the upper ends of the scales 5 and 8 coincide with the zygomata A of the face.

The arms 4 and 6 are then angularly adjusted until the said arms fit to the parts A and B of the face and therefore made to correspond with the facial angle, care being taken that the connection at 3 permits a sliding adjustment in the slot 2 and both arms 4 and 6 make the same angle with the bar 1 which should be horizontal. The pointer 9 will then indicate on the table 11 of the chart 10 the tooth conformation required for the patient; and this in connection, with the distance from the level of the zygomata A to the tip of the chin, as indicated by use of the scales 5 and 8, will determine both the tooth conformation and length of tooth required. In making the measurement on the scales 5 and 8, it is desirable to hold a pencil, rule or any straight edge in contact with the chin, and to corresponding numbers of the scales, thus not relying upon the eye wholly. In the particular illustration shown in the drawing, the horizontal line would correspond to 4 on the scales and hence the teeth may be either medium or long, as desired, but in a case like this it is desirable that the length should correspond to the "medium," being the next smaller length. The indicator, therefore, shows that the tooth selection should be "tapering 2 N."

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having fully described my invention, what I claim as new and desire to secure by Letters Patent of the United States is:

1. In a gage for selecting artificial teeth to be used in dentures, the combination with means adjustable to the angular conformation of the human face, of a chart having tooth form designations thereon, and means coöperating with the chart for determining the tooth form corresponding to the facial angle determined.

2. In a tooth gage, the combination of means adjustable to the angular conformation of the human face, a chart having tooth form designations thereon, and means coöperating with the chart for determining the tooth form corresponding to the facial angle determined, the means for determining the facial angle provided with indicating means for determining the length of the tooth form required.

3. In a gage for selecting artificial teeth to be used in dentures, the combination with a bar, of an arm pivotally connected to said bar and adapted to be adjusted to the angular conformation of a human face, a pointer carried by said arm, and a chart on the bar having a table of tooth forms thereon coöperating with said pointer to determine the tooth form required to correspond to the facial angle determined.

4. In a gage for selecting artificial teeth to be used in dentures, the combination with a bar, of a pair of arms pivotally connected to said bar and adapted to be adjusted to the angular conformation of the human face, and to permit the bar being held horizontally, a pointed carried by one of said arms, and a chart on the bar having a table of tooth forms thereon coöperating with said pointer to determine the tooth form required to correspond to the facial angle determined.

5. In a gage for selecting artificial teeth to be used in dentures, the combination with a bar, of an arm pivotally and slidingly connected to said bar, and adapted to angular adjustment relative to the bar, a second arm pivoted to said bar, said arms being both adapted to be adjusted to the angular conformation of the human face, a pointer carried by said second named arm, and a chart having a table of tooth forms thereon coöperating with said pointer to determine the tooth form required to correspond to the facial angle measured.

6. In a gage for selecting artificial teeth to be used in dentures, the combination with a bar, of an arm pivoted to said bar and adapted to be adjusted to the angle of conformation of the human face, a scale on said arm provided with designations of different tooth lengths, a pointer carried by said arm, and a chart coöperating with said pointer, said chart being provided with a plurality of tooth indications for each angular facial measurement, said indications having corresponding indications on said scale.

7. In a gage for selecting artificial teeth to be used in dentures, the combination of means adjustable to the angular conformation of the human face, with a chart having tooth form designations thereon to correspond to the requirement of faces of different shapes, said chart and adjustable means coöperatively arranged for indicating upon the chart the proper tooth form for the particular angular conformation of the human face.

8. In a gage for selecting artificial teeth to be used in dentures, the combination of means adjustable to the angular conformation of the human face, with a chart having tooth form designations thereon to correspond to the requirement of faces of different shapes, said chart and adjustable means coöperatively arranged for indicating upon the chart the proper tooth form for the particular angular conformation of the human face, said tooth gage further provided with indicating designations for determining the length of the tooth form required, arranged upon the means adjusted to the angular conformation of the human face and located adjacent to that part thereof which comes next to the chin of the face, whereby the proper length of the tooth may be determined.

In testimony whereof, I have hereunto set my hand and affixed my seal.

WILLIAM C. DALBEY. [L. S.]